M. SCHOREN.
WEED CUTTING MACHINE.
APPLICATION FILED AUG. 4, 1914.
1,160,774.
Patented Nov. 16, 1915.
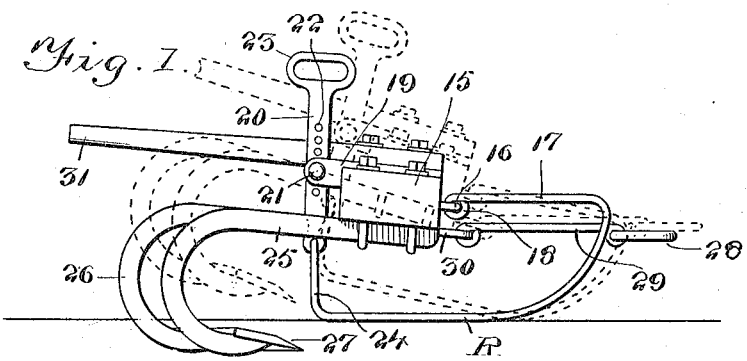
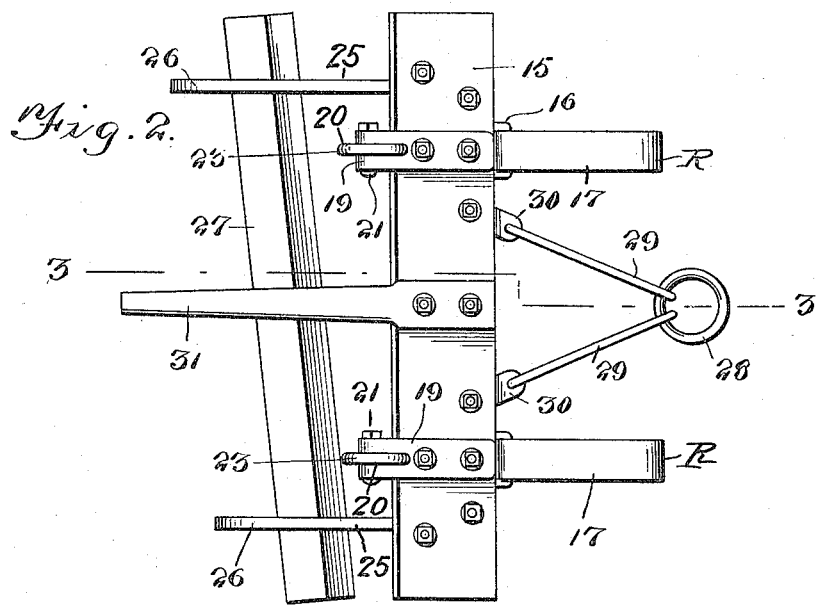
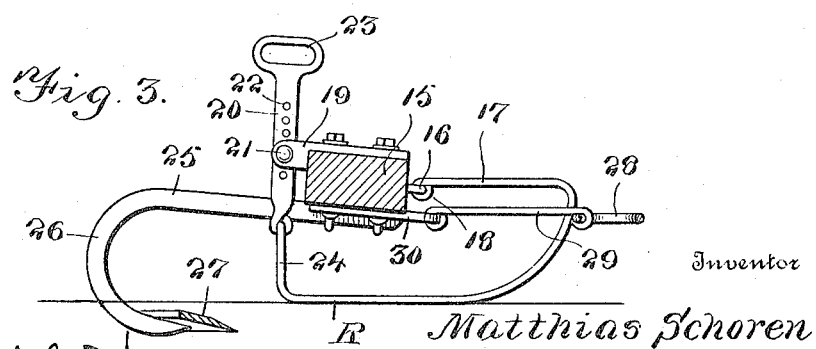
Inventor
Matthias Schoren
By Victor J. Evans
Attorney
Witnesses

UNITED STATES PATENT OFFICE.

MATTHIAS SCHOREN, OF THE DALLES, OREGON.

WEED-CUTTING MACHINE.

1,160,774.   Specification of Letters Patent.   Patented Nov. 16, 1915.

Application filed August 4, 1914. Serial No. 855,040.

*To all whom it may concern:*

Be it known that I, MATTHIAS SCHOREN, a citizen of the United States, residing in the city of The Dalles, county of Wasco, and State of Oregon, have invented a new and useful Weed-Cutting Machine, of which the following is a specification.

This invention relates to weed cutting machines, and it has for its object to produce a device of this class which will be simple in construction and effective in operation.

A further object of the invention is to produce a device including a body member, runners with which the said body member is adjustably connected, and blade carrying beams supported by said body member so that the blade, by relative adjustment of the body member and the runners, may be raised or lowered with respect to the surface of the ground.

A further object of the invention is to produce a device of the character described in which the cutting blade, by tilting the runners with which the body member is connected, may be raised or lifted to a non-engaging position with respect to the ground for convenience in transporting the machine from place to place.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however understood that no limitation is necessarily made to the precise structural details therein exhibited, but that changes, alterations and modifications within the scope of the claims may be resorted to when desired.

In the drawing, Figure 1 is a side elevation of a machine constructed in accordance with the invention. Fig. 2 is a top plan view of the same. Fig. 3 is a vertical sectional view taken on the line 3—3 in Fig. 2.

Corresponding parts in the several figures are denoted by like characters of reference.

The body member 15 which is of rectangular cross section is provided on its front face with keepers 16 with which the runners R are hingedly connected, said runners being shown as being provided with arms 17 extending rearwardly from their upturned front ends, said arms having terminal eyes 18 engaging the keepers. The body member 15 is provided with rearwardly extending lugs or brackets 19 with which adjusting members 20 are adjustably connected by means of bolts 21, said adjusting members being each provided with a plurality of apertures 22 for the passage of the bolts, and each adjusting member having at its upper end a handle 23 whereby it may be conveniently manipulated. The adjusting members 20 are connected at their lower ends with arms 24 that extend upwardly from the rear ends of the runners.

The body member is provided with rearwardly extending beams 25 having arcuate standards 26 on which a blade or cutting member 27 is supported, said blade occupying a downwardly and forwardly inclined position. The beams 25 are of unequal length, and the blade 27 will thus be supported obliquely with respect to the body member 15, thereby rendering the cutting operation of said blade thoroughly effective. Draft may be applied to a ring 28 carried by links 29 which are connected with lugs 30 secured on the body member. The body member 15 is provided with a rearwardly extending handle 31 whereby it may be manipulated, as will be presently described.

It will be seen that by proper adjustment of the adjusting members 20, the body member 15 may be raised or lowered with respect to the runners, thereby placing the blade 27 in position to cut into the ground at the requisite depth. The blade may be forced positively in ground engaging direction by bearing downward on the handle 31. By bearing upward on said handle, the device may be tilted on the runners R to raise the blade entirely clear of the ground for convenience in transporting the machine from place to place.

Having thus described the invention, what is claimed as new, is:—

1. In a weed cutting machine, a body member having a rearwardly extending handle, runners connected hingedly with the front face of the body member, lugs extending rearwardly from the body member, adjusting members connected with the rearward ends of the runners and also connected adjustably with the lugs, beams extending rearwardly from the body member and having arcuate standards, and a cutting blade supported on the standards.

2. In a weed cutting machine, a body member having a rearwardly extending handle, runners connected hingedly with the front face of the body member, lugs extending rearwardly from the body member, adjusting members connected with the rearward ends of the runners and also connected adjustably with the lugs, beams extending rearwardly from the body member and having arcuate standards, and a cutting blade supported on the standards, said beams being of unequal length, thereby presenting the cutting blade obliquely with respect to the body member.

3. A weed cutting device comprising a body member, keepers on the front face thereof, runners having rearwardly extending arms provided with terminal eyes engaging the keepers, adjusting members supported for vertical adjustment with respect to the body member, said adjusting members being connected with the rearward ends of the runners, a handle connected with and extending rearwardly from the body member whereby said body member and the runners may be tilted, beams connected with and extending rearwardly from the body member, said beams having arcuate standards, and a cutting blade supported on said standards.

MATTHIAS SCHOREN.

Witnesses:
ALVIA FERGUSON,
HENRY CUE.

Copies of this patent may be obtained for five cents each, by addressing the "Commissioner of Patents, Washington, D. C."